US007886589B2

(12) United States Patent
Capdepon et al.

(10) Patent No.: US 7,886,589 B2
(45) Date of Patent: Feb. 15, 2011

(54) ELECTRONIC UNIT FOR MEASURING OPERATING PARAMETERS OF A VEHICLE WHEEL

(75) Inventors: Gilles Capdepon, Muret (FR); Olivier Gout, Cugnaux (FR); Christian Kempf, Toulouse (FR); Pierre Laporte, Laffitte Vigordane (FR)

(73) Assignee: Continental Automotive France, Toulouse (FR)

( * ) Notice: Subject to any disclaimer, the term of this patent is extended or adjusted under 35 U.S.C. 154(b) by 566 days.

(21) Appl. No.: 11/872,253

(22) Filed: Oct. 15, 2007

(65) Prior Publication Data

US 2008/0250852 A1 Oct. 16, 2008

Related U.S. Application Data

(60) Provisional application No. 60/852,333, filed on Oct. 16, 2006.

(30) Foreign Application Priority Data

May 7, 2007 (FR) .................................. 07 03286

(51) Int. Cl.
*B60C 23/02* (2006.01)

(52) U.S. Cl. ........................................ 73/146.8; 73/146

(58) Field of Classification Search ....................... None
See application file for complete search history.

(56) References Cited

U.S. PATENT DOCUMENTS 6,591,672 B2 * 7/2003 Chuang et al. ............. 73/146.8
7,059,178 B2 * 6/2006 Fischer et al. ................ 73/147

* cited by examiner

*Primary Examiner*—Lisa M Caputo
*Assistant Examiner*—Jermaine Jenkins
(74) *Attorney, Agent, or Firm*—Young & Thompson

(57) ABSTRACT

An electronic unit for measuring operating parameters of a vehicle wheel, including an electronic module (1) and an inflation valve (2) comprising a body (6, 7) designed to extend through an orifice arranged in a wheel rim, and an assembly head (4) separated from the body by a shoulder forming a face for locking the inflation valve against the rim. The electronic module (1) includes an outer wall (13, 14) defining a lateral housing for the assembly head (4) of the inflation valve (2), delimited by a metal plate (11) made in one piece with the electronic module, for pressing of the locking face of the assembly head, and furnished with a notch for the body (6, 7) of the inflation valve to pass through.

19 Claims, 2 Drawing Sheets

Figures 1, 2:
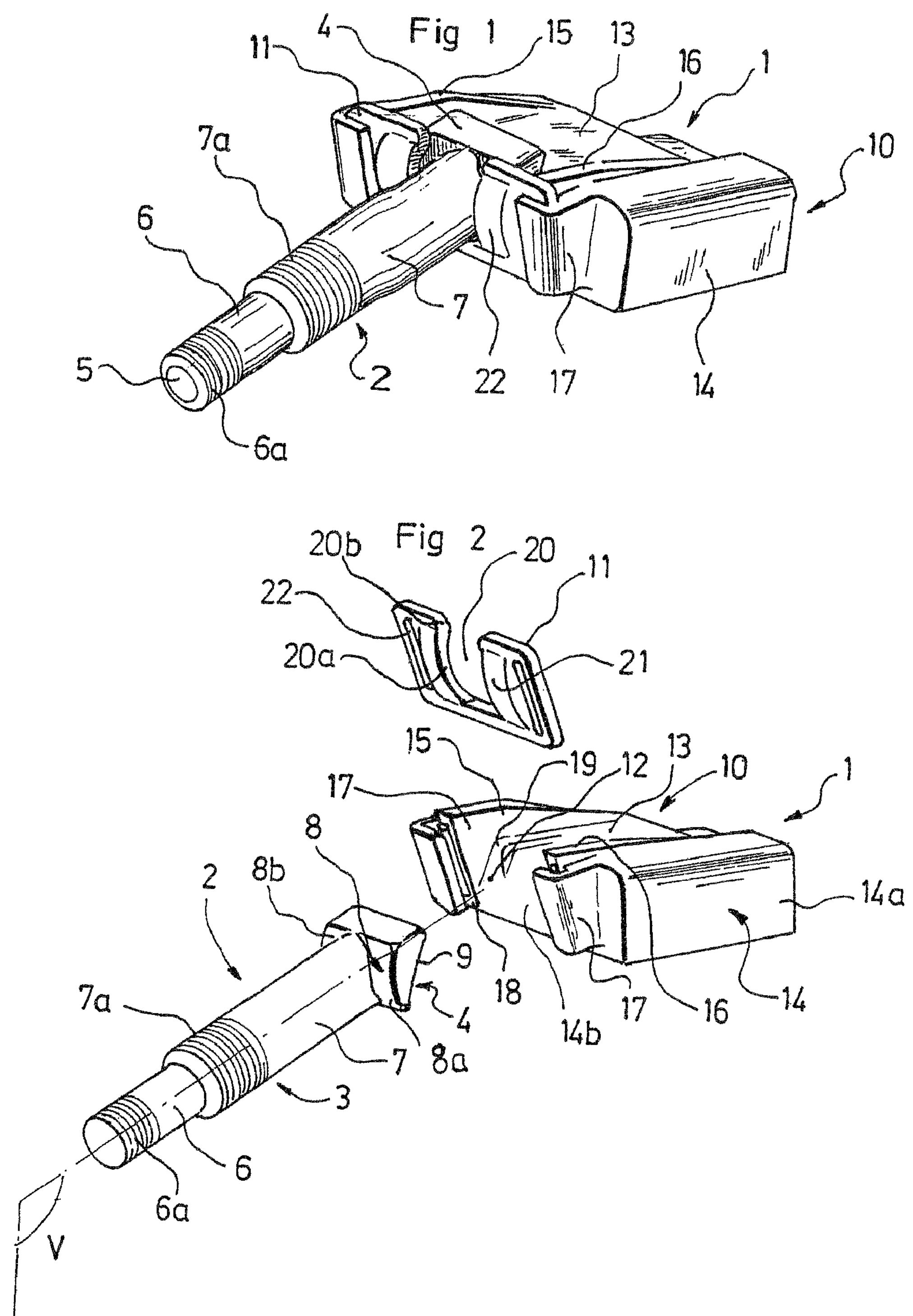

11
4
15
13
16
1
10
7a
6
7
5
2
22
17
14
6a 20b
20
11
22
20a
21
15
19
12
13
10
1
17
8
2
8b
14a
9
18
4
14b
17
16
14
7a
7
8a
3
6
6a
V

ELECTRONIC UNIT FOR MEASURING OPERATING PARAMETERS OF A VEHICLE WHEEL

BACKGROUND OF THE INVENTION

1. Field of the Invention

The invention relates to an electronic unit for measuring operating parameters of a vehicle wheel, comprising an electronic module and an inflation valve for fixedly attaching said electronic module to a wheel rim.

2. Description of the Related Art

More and more motor vehicles have systems for monitoring and/or measuring parameters comprising sensors mounted on said vehicle.

As an example relating to such systems, mention may be made of the monitoring systems comprising electronic modules mounted on each of the vehicle wheels, dedicated to measuring parameters such as pressure and/or temperature of the tires fitted to these wheels, and designed to inform the driver of any abnormal variation of the measured parameter.

One of the current solutions most commonly used in order to attach the electronic modules to the wheel rims consists in producing electronic units each consisting of an electronic module and an inflation valve assembled with said electronic module for fixedly attaching the latter to a wheel rim.

In addition, each electronic module then conventionally comprises an external "eyelet" and each inflation valve comprises a body designed to extend through the eyelet and an orifice made in the rim, and an assembly head separated from the body by a shoulder forming a face for locking the eyelet and said inflation valve against said rim.

Such a design makes it possible to obtain a screwing torque capable of ensuring a correct retention of the electronic modules despite the considerable stresses (centrifugal force, vibrations, accelerations, etc.) to which the latter are subjected.

However, the transmission of the forces makes it necessary to significantly stiffen the electronic modules and therefore leads to making the latter complex.

In addition, the principle of assembling the inflation valve on the electronic module requires arranging a dead volume specifically dedicated to the installation of the inflation valve, and leads to considerable overdimensioning and excess weight of the electronic modules.

SUMMARY OF THE INVENTION

The present invention aims to alleviate these disadvantages and its main objective is to provide an electronic unit capable of withstanding the considerable stresses and provided with an electronic module having optimally reduced size and weight.

Accordingly, the subject of the invention is an electronic unit comprising an electronic module and an inflation valve for fixedly attaching said electronic module to a wheel rim, comprising a body designed to extend through an orifice made in the rim and an assembly head separated from the body by a shoulder forming a face for locking said inflation valve against said rim.

According to the invention, the electronic module of this electronic unit comprises an outer wall defining a lateral housing for the assembly head of the inflation valve, delimited by a metal plate made in one piece with said electronic module, for pressing of the locking face of said assembly head, and furnished with a notch for the body of said inflation valve to pass through.

According to the invention, the assembly head comes to be wedged and locked against a metal plate which makes it possible to produce a kinematic chain for transmitting forces consisting only of contacts between metal parts and therefore capable of ensuring an increased retention of the screwing torque.

In addition, the installation of the inflation valve does not require a dead zone because the assembly head may be inserted directly into the lateral housing designed to receive it. Accordingly, the dimensions and the weight of the electronic modules may be optimized.

According to an advantageous embodiment of the invention, the notch of the metal plate has a shape forming a retention means for the body of the inflation valve extending through said notch.

This arrangement makes it possible to obtain a preassembly of the two elements of each electronic unit in particular making the storage and handling of the latter easier until it is attached to the rim.

It should also be noted that, because the shape of the notch forms a means for retaining the inflation valve, the body of the inflation valve must be presented inclined "slantwise" in order to slide inside this notch in order to be held therein. However, this installation operation does not require any specific dead volume, so that the dimensions of the electronic modules are not affected by such an installation.

Furthermore, in an advantageous manner according to the invention, the electronic module is made by molding of a plastic, and the metal plate consists of an insert that is overmolded when said electronic module is produced.

In addition, the metal plate is then also advantageously pierced with two openings positioned respectively on either side of the notch and suitable for being filled when the electronic module is molded.

Furthermore, the metal plate and the locking face of the assembly head advantageously have cylindrical contact faces allowing the inclination of the electronic module to be adjusted relative to the longitudinal axis of the inflation valve, before the latter is locked against the rim. Such an articulation makes it possible to adjust the position of the electronic modules according to the profiles of the rims, particularly for the purpose of keeping said electronic modules in contact with the bottom of the rim and thereby limiting the stresses sustained.

According to another advantageous embodiment of the invention, the notch of the metal plate has a section of increasing thickness from the bottom of said notch to each of the ends of the latter. This variable thickness makes it possible specifically to produce a cam profile which tends to oppose the tilting of the electronic module under the effect of centrifugal force.

Furthermore, in order to stiffen the electronic module, the latter advantageously comprises a transverse wall bordered by a peripheral return, on which two parallel external ribs are arranged extending into two consoles between the ends of which the metal plate extends, so that the lateral housing is delimited by said metal plate, said consoles and the peripheral return.

In addition, in order to make it easier for the air to travel through the axial air flow duct usually pierced in the inflation valve and emerging at a face, called the rear face, of the assembly head opposite to the locking face, the lateral housing advantageously comprises two internal ribs protruding into said lateral housing, arranged so as to define two linear pressure surfaces for the rear face of the assembly head, and placed so as to extend on either side of the outflow of the air duct.

It will be noted that the invention makes it possible to fixedly attach (and detach) quickly and very easily the module and the inflation valve. Specifically, these two elements are simply nested in one another and held in place before final fastening by simple retention means. The fastening and the final (but reversible) locking of the assembly (module+valve) is carried out only when the valve is fastened to the rim by means of a conventional nut. Placing the module on the valve is therefore easy and not very costly.

BRIEF DESCRIPTION OF THE DRAWING FIGURES

Figure 3:
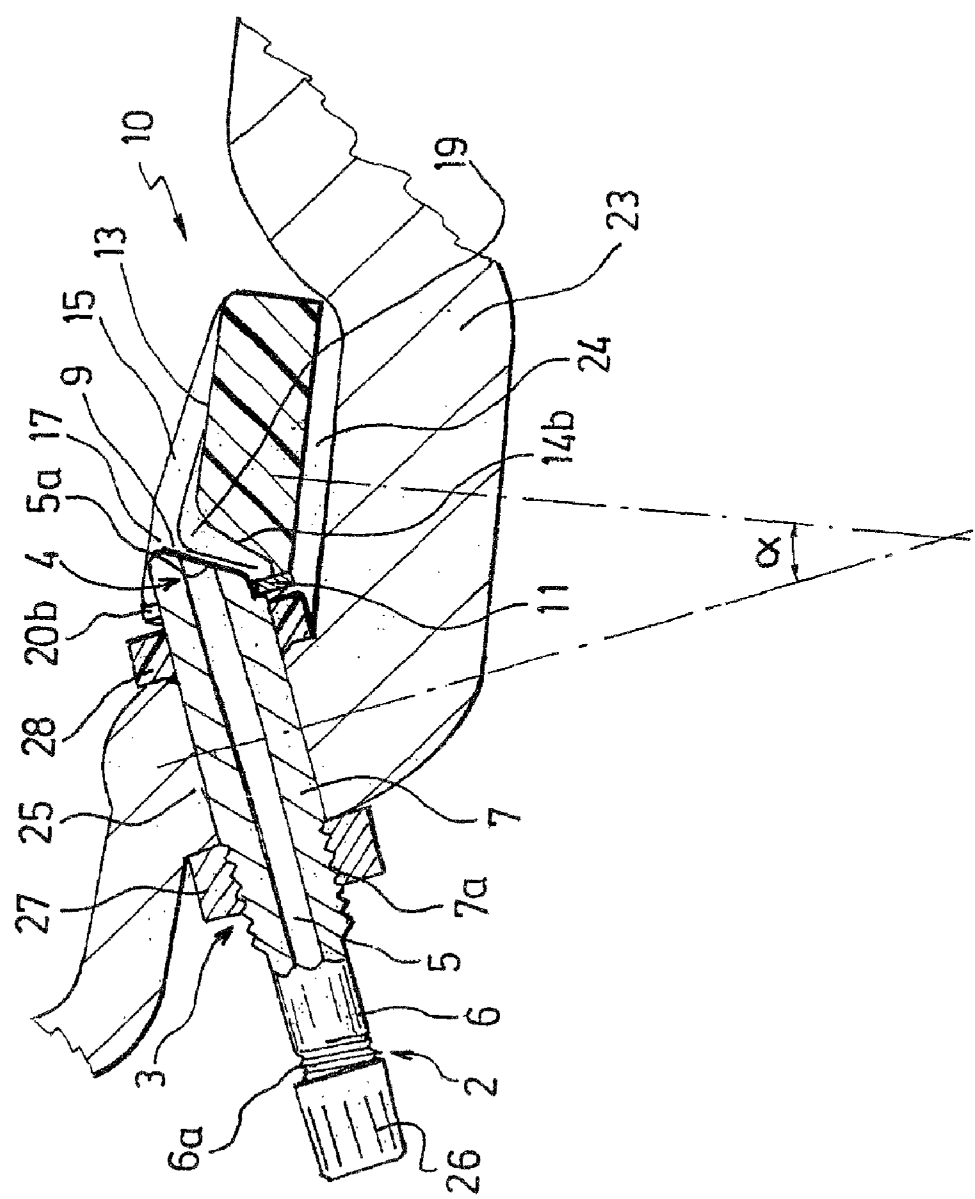

Other features, objects and advantages of the invention will emerge from the following detailed description with reference to the appended drawings which, as a nonlimiting example, represent a preferred embodiment thereof. In these drawings:

FIG. 1 is a view in perspective of an electronic unit according to the invention, FIG. 2 is a view in perspective in exploded mode of this electronic unit, and FIG. 3 is a cross section representing this electronic unit installed on a vehicle wheel rim.

DETAILED DESCRIPTION OF THE INVENTION

The electronic unit according to the invention shown as an example in the figures is designed to be installed on a vehicle wheel for the purpose of measuring operating parameters (pressure, temperature, acceleration, etc.) of said wheel and of transmitting the measured data to a central unit installed on the vehicle.

This electronic unit consists of an electronic module 1 suitable for being installed inside the casing of a tire, and an inflation valve 2 articulated on said electronic module, for fixedly attaching the latter to the rim of the wheel fitted with this tire.

First, the inflation valve 2 is made in a single piece and comprises a cylindrical body 3 (FIG. 2) extended by an assembly head 4, said body and assembly head being pierced with an axial air flow duct 5 emerging at the rear face 9 of the assembly head 4.

The body 3 of this inflation valve 4 also consists of two cylindrical longitudinal sections of different diameters:

- an end section 6 of lesser diameter, furnished with an end portion that is threaded for the installation of a cap 26 (FIG. 3) for closing off said air flow duct 5 (FIG. 1),
- and an intermediate section 7 extended by the assembly head 4, also having an end portion 7*a* that is threaded for the attachment of the electronic unit to the rim.

The assembly head 4 of this inflation valve 2 has, for its part, a width greater than that of the diameter of the intermediate section 7 and a height substantially equal to said diameter, so as to be separated from the body 3 by a shoulder 8 forming a transverse face, called the locking face, being divided into two half-faces 8*a*, 8*b* distributed symmetrically on either side of said body.

In addition, each of these two half-faces 8*a*, 8*b* has a convex rounded shape suitable for allowing the inflation valve 2 to pivot about an axis perpendicular to the axis of symmetry V of the latter.

The rear face 9 of this assembly head 4 consists, for its part, of a flat face lying on an axis inclined at approximately 130° relative to the longitudinal axis of the inflation valve 2.

The electronic module 1 of this electronic unit consists, for its part, of an actual module 10 and a metal insert 11, suitable for delimiting a housing 12 for the assembly head 4 of the inflation valve 2. In addition, the module 10 is made by molding of a plastic and the insert 11 is overmolded when said electronic module is produced.

First, the module 10 consists in a hollow casing designed to house "the electronics" of the electronic unit and formed by a transverse wall 13 bordered by a peripheral return 14.

In addition, two parallel external ribs 15, 16 are arranged on the transverse wall 13, said ribs extending into two consoles 17 conformed, during the molding, in order to each delimit a groove 18 inserting by overmolding one of the ends of the insert 11.

As shown in the figures, the two consoles 17, the insert 11 and the return 14 are arranged so as to delimit a lateral housing 12 of a shape suitable for housing the assembly head 4.

It should be noted that, for this purpose, the length 14*b* (FIG. 3) of the return 14 corresponding to the housing 12 forms an inclined face paired with the rear face 9 of the assembly head 4, while the portion of length 14*a* (FIG. 2) of the return 14 outside this housing 12 is orthogonal to the transverse face 13.

Finally, the lateral housing 12 comprises two internal ribs 19 arranged in protrusion relative to the return 14*b*, inside said lateral housing, so as to define two linear pressure surfaces for the rear face 9 of the assembly head 4, and placed so as to extend on either side of the outflow 5*a* (FIG. 3) of the air duct 5.

Finally, the insert 11 (FIG. 2) consists of a metal plate for pressing of the locking face 8 of the assembly head 4 of the inflation valve 2, furnished with a notch 20 for the body 3 of said inflation valve to pass through.

In addition, the shape of this notch 20 forms a means for retaining the intermediate section 7 of the body 3 of the inflation valve 2 extending through said notch.

Finally, this notch 20 has a section 20*a* of increasing thickness from the bottom of said notch to each of the ends 20*b* of the latter.

On either side of this notch 20, the insert 11 comprises a concave rounded bearing surface 21 for receiving and for pressing the locking face 8 of the assembly head 4.

Finally, the insert 1 comprises two openings 22 positioned respectively on either side of the notch 20 and suitable for extending inside the "grooves" 18 in order to be filled when the electronic module 1 is molded.

The electronic module 1 and the inflation valve 2 of the electronic unit according to the invention may, first, be pre-assembled, thanks to the shape of the notch 20 (also forming retention means), in a position of the inflation valve 2 in which the assembly head 4 is housed in the lateral housing 12.

It is essential to note that such an installation of the inflation valve 2 does not require a dead zone because the assembly head 4 may be inserted directly, by presenting it inclined, into the lateral housing 12 designed to receive it. Accordingly, the dimensions and the weight of the electronic modules 1 may be optimized.

For the purpose of installing the electronic unit on a rim 23, an annular seal 28 (FIG. 3) is positioned about the intermediate section 7 of the body 3, so as to be compressed between the rim 23 and the insert 11 after said body is installed in a bore conventionally arranged in said rim. This annular seal is contained (at least partially) in a metal cup (not shown). Accordingly, during the tightening of the seal between the rim and the insert, only metal parts are in contact with one another.

The inclination of the electronic module 1 is then adjusted according to the angle $\alpha$ that defines the profile of the rim, mainly in order to hold said electronic module in the recess 24 that forms the bottom of the rim 23 and thereby to limit the stresses sustained.

Finally, the electronic unit is locked by means of a (metal) nut 27 screwed onto the threaded end portion 7*a* of the intermediate section 7 of the body 3.

Once this locking is achieved, the assembly head 4 is wedged and locked against the insert 11 and the kinematic chain for transmitting the forces therefore consists only of contacts between metal parts which ensure an increased retention of the screwing torque.

In addition, the installation of the inflation valve 2 does not require a dead zone because the assembly head 4 may be inserted directly into the lateral housing 12 designed to receive it. Accordingly, the dimensions and the weight of the electronic modules 1 may be optimized.

"Dead zone" means a zone made in the module 10 solely to receive the valve head, without being able to insert any electronics therein, as is the case for example when the module is pierced right through in order to house the inflation valve 2 therein. According to the invention, the portion of the module containing the electronics is dimensioned solely to receive these electronics. The zone 12 for receiving the valve head (therefore for attachment between the valve and the module) is situated outside the electronics compartment (laterally in the example shown).

The invention claimed is:

1. An electronic unit for measuring operating parameters of a vehicle wheel, comprising:

an electronic module (1);

an inflation valve (2) for fixedly attaching said electronic module to a wheel rim (23);

a body (3) of the inflation valve (2) designed to extend through an orifice made in the rim (23); and an assembly head (4) of the inflation valve (2) separated from the body (3) by a shoulder (8) forming a face for locking said inflation valve against said rim, wherein the electronic module (1) comprises an outer wall (13, 14) defining a lateral housing (12) for the assembly head (4) of the inflation valve (2), delimited by a metal insert (11) made in one piece with said electronic module, for pressing of the locking face (8) of said assembly head, the insert (11) being furnished with a notch (20) having a retaining shape for the body (3) of said inflation valve to pass through, and the insert is configured to increase retention of screwing torque, the electronic module (1) is made by molding of a plastic, and the metal insert (11) is overmolded when said electronic module is produced, and the metal insert (11) is pierced with two openings (22) positioned respectively on either side of the notch (20) and suitable for being filled when the electronic module (1) is molded.

2. The electronic unit as claimed in claim 1, wherein the notch (20) of the metal insert (11) has the retaining shape for the body (3) of the inflation valve (2) extending through said notch.

3. The electronic unit as claimed in claim 2, wherein the electronic module (1) is made by molding of a plastic, the metal insert (11) is an insert that is overmolded when said electronic module is produced.

4. The electronic unit as claimed in claim 3, wherein the metal insert (11) is pierced with two openings (22) positioned respectively on either side of the notch (20) and suitable for being filled when the electronic module (1) is molded.

5. The electronic unit as claimed in claim 2, wherein the metal insert (11) and the locking face (8) of the assembly head (4) have cylindrical contact faces (21) allowing the inclination of the electronic module (1) to be adjusted relative to a longitudinal axis of the inflation valve (2), before the latter is locked against the rim (23).

6. The electronic unit as claimed in claim 2, wherein the electronic module (1) comprises a transverse wall (13) bordered by a peripheral return (14), on which two parallel external ribs (15, 16) are arranged extending into two consoles (17) between the ends of which the metal insert (11) extends, so that the lateral housing (12) is delimited by said metal plate, said consoles and the peripheral return (14).

7. The electronic unit as claimed in claim 1, wherein the metal insert (11) and the locking face (8) of the assembly head (4) have cylindrical contact faces (21) allowing the inclination of the electronic module (1) to be adjusted relative to a longitudinal axis of the inflation valve (2), before the inflation valve (2) is locked against the rim (23).

8. The electronic unit as claimed in claim 7, wherein the notch (20) of the metal insert (11) has a section (20*a*, 20*b*) of increasing thickness from the bottom of said notch to each of the ends of the latter.

9. The electronic unit as claimed in claim 8, wherein the electronic module (1) comprises a transverse wall (13) bordered by a peripheral return (14), on which two parallel external ribs (15, 16) are arranged extending into two consoles (17) between the ends of which the metal insert (11) extends, so that the lateral housing (12) is delimited by said metal plate, said consoles and the peripheral return (14).

10. The electronic unit as claimed in claim 7, wherein the electronic module (1) comprises a transverse wall (13) bordered by a peripheral return (14), on which two parallel external ribs (15, 16) are arranged extending into two consoles (17) between the ends of which the metal insert (11) extends, so that the lateral housing (12) is delimited by said metal plate, said consoles and the peripheral return (14).

11. The electronic unit as claimed in claim 1, wherein the electronic module (1) comprises a transverse wall (13) bordered by a peripheral return (14), on which two parallel external ribs (15, 16) are arranged extending into two consoles (17) between ends of which the metal insert (11) extends, so that the lateral housing (12) is delimited by said metal plate, said consoles and the peripheral return (14).

12. The electronic unit as claimed in claim 11, wherein the inflation valve (2) is pierced with an axial air flow duct (5) emerging at a rear face (9) of the assembly head (4) opposite to the locking face (8), wherein the lateral housing (12) comprises two internal ribs (19) protruding into said lateral housing, arranged so as to define two linear pressure surfaces for the rear face (9) of the assembly head (4), and placed so as to extend on either side of the outflow (5*a*) of the air duct (5).

13. The electronic unit as claimed in claim 1, wherein the metal insert (11) and the locking face (8) of the assembly head (4) have cylindrical contact faces (21) allowing the inclination of the electronic module (1) to be adjusted relative to a longitudinal axis of the inflation valve (2), before the latter is locked against the rim (23).

14. The electronic unit as claimed in claim 1, wherein the metal insert (11) and the locking face (8) of the assembly head (4) have cylindrical contact faces (21) allowing the inclination of the electronic module (1) to be adjusted relative to a longitudinal axis of the inflation valve (2), before the latter is locked against the rim (23).

15. The electronic unit as claimed in claim 1, wherein the electronic module (1) comprises a transverse wall (13) bordered by a peripheral return (14), on which two parallel external ribs (15, 16) are arranged extending into two consoles (17) between the ends of which the metal insert (11) extends, so that the lateral housing (12) is delimited by said metal plate, said consoles and the peripheral return (14).

16. The electronic unit as claimed in claim 1, wherein the electronic module (1) comprises a transverse wall (13) bordered by a peripheral return (14), on which two parallel external ribs (15, 16) are arranged extending into two consoles (17) between the ends of which the metal insert (11) extends, so that the lateral housing (12) is delimited by said metal plate, said consoles and the peripheral return (14).

17. An electronic unit for measuring operating parameters of a vehicle wheel, comprising:

an electronic module (1);

an inflation valve (2) for fixedly attaching said electronic module to a wheel rim (23);

a body (3) of the inflation valve (2) designed to extend through an orifice made in the rim (23); and an assembly head (4) of the inflation valve (2) separated from the body (3) by a shoulder (8) forming a face for locking said inflation valve against said rim, wherein the electronic module (1) comprises an outer wall (13, 14) defining a lateral housing (12) for the assembly head (4) of the inflation valve (2), delimited by a metal insert (11) made in one piece with said electronic module, for pressing of the locking face (8) of said assembly head, the insert (11) being furnished with a notch (20) having a retaining shape for the body (3) of said inflation valve to pass through, and the insert is configured to increase retention of screwing torque, and the electronic module (1) comprises a transverse wall (13) bordered by a peripheral return (14), on which two parallel external ribs (15, 16) are arranged extending into two consoles (17) between ends of which the metal insert (11) extends, so that the lateral housing (12) is delimited by said metal plate, said consoles and the peripheral return (14).

18. The electronic unit as claimed in claim 17 wherein the inflation valve (2) is pierced with an axial air flow duct (5) emerging at a rear face (9) of the assembly head (4) opposite to the locking face (8), and the lateral housing (12) comprises two internal ribs (19) protruding into said lateral housing, arranged so as to define two linear pressure surfaces for the rear face (9) of the assembly head (4), and placed so as to extend on either side of the outflow (5*a*) of the air duct (5).

19. An electronic unit for measuring operating parameters of a vehicle wheel, comprising:

an electronic module (1);

an inflation valve (2) for fixedly attaching said electronic module to a wheel rim (23);

a body (3) of the inflation valve (2) designed to extend through an orifice made in the rim (23); and an assembly head (4) of the inflation valve (2) separated from the body (3) by a shoulder (8) forming a face for locking said inflation valve against said rim, wherein the electronic module (1) comprises an outer wall (13, 14) defining a lateral housing (12) for the assembly head (4) of the inflation valve (2), delimited by a metal insert (11) made in one piece with said electronic module, for pressing of the locking face (8) of said assembly head, the insert (11) being furnished with a notch (20) having a retaining shape for the body (3) of said inflation valve to pass through, and the insert is configured to increase retention of screwing torque, the notch (20) of the metal insert (11) has the retaining shape for the body (3) of the inflation valve (2) extending through said notch, the electronic module (1) is made by molding of a plastic, and the metal insert (11) is overmolded when said electronic module is produced, and the metal insert (11) is pierced with two openings (22) positioned respectively on either side of the notch (20) and suitable for being filled when the electronic module (1) is molded.

* * * * *